(12) United States Patent
Bakhsh et al.

(10) Patent No.: US 6,851,707 B2
(45) Date of Patent: Feb. 8, 2005

(54) INFLATABLE SIDE CURTAIN

(75) Inventors: Ali Emam Bakhsh, Rochester Hills, MI (US); Russell E. Stein, Leonard, MI (US); Ayad G. Nayef, Sterling Heights, MI (US); Kevin J. Boxey, Columbiaville, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 33 days.

(21) Appl. No.: 09/963,618

(22) Filed: Sep. 26, 2001

(65) Prior Publication Data

US 2002/0036395 A1 Mar. 28, 2002

Related U.S. Application Data

(63) Continuation-in-part of application No. 09/946,287, filed on Sep. 5, 2001, now Pat. No. 6,431,590, which is a continuation of application No. 09/672,547, filed on Sep. 28, 2000, now abandoned, and a continuation-in-part of application No. 09/956,227, filed on Sep. 19, 2001, now Pat. No. 6,471,240, which is a continuation of application No. 09/579,162, filed on May 25, 2000, now abandoned.
(60) Provisional application No. 60/190,199, filed on Mar. 17, 2000.

(51) Int. Cl.$^7$ .............................................. B60R 21/22
(52) U.S. Cl. ................................ 280/730.2; 280/728.2; 280/749
(58) Field of Search ........................... 280/730.2, 728.2, 280/743.1, 728.1, 730.1, 742, 749

(56) References Cited

U.S. PATENT DOCUMENTS

| | | | |
|---|---|---|---|
| 3,731,949 A | 5/1973 | Radke | |
| 5,427,410 A | 6/1995 | Shiota et al. | |
| 5,439,247 A | 8/1995 | Kolb | |
| 5,490,691 A | * 2/1996 | Sinnhuber et al. | .......... 280/735 |
| 5,524,924 A | 6/1996 | Steffens, Jr. et al. | |
| 5,588,672 A | 12/1996 | Karlow et al. | |
| 5,730,463 A | 3/1998 | Fisher et al. | |
| 5,788,270 A | 8/1998 | Haland et al. | |
| 5,865,462 A | 2/1999 | Robins et al. | |
| 5,884,937 A | 3/1999 | Yamada | |
| 5,899,490 A | 5/1999 | Wipasuramonton et al. | |
| 5,899,491 A | 5/1999 | Tschaeschke | |
| 5,924,723 A | 7/1999 | Brantman et al. | |
| 5,957,487 A | 9/1999 | Stütz | |
| 5,960,611 A | 10/1999 | Aigner et al. | |
| 5,984,348 A | * 11/1999 | Specht et al. | ............ 280/730.2 |

(List continued on next page.)

FOREIGN PATENT DOCUMENTS

| | | |
|---|---|---|
| DE | 4134995 | 3/1993 |
| DE | 4307175 | 9/1993 |
| DE | 19743626 | 4/1998 |
| DE | 29914637 | 1/2000 |
| GB | 2314300 | 12/1997 |

Primary Examiner—David R. Dunn
(74) Attorney, Agent, or Firm—Tarolli, Sundheim, Covell & Tummino L.L.P.

(57) ABSTRACT

Apparatus (10) includes an inflatable vehicle occupant protection device (14) inflatable into a position between a side structure (16) of a vehicle (12) and a vehicle occupant (252). The protection device (14) includes a forwardmost inflatable chamber (122). The protection device (14) is rolled up in an outboard direction into a stored position. An inflation fluid source (24) provides inflation fluid for inflating the device (14) for at least five seconds. The device (14) is adapted to inflate and unroll in a downward direction away from the vehicle roof (18). A first portion (270) is adapted to engage an occupant's head (250) positioned against the side structure (16). The first portion (270) moves the occupant's head (250) laterally in the vehicle (12) away from the side structure (16) and inflates between the side structure of the vehicle and the occupant's head.

25 Claims, 11 Drawing Sheets

U.S. PATENT DOCUMENTS

| | | | |
|---|---|---|---|
| 6,010,149 A | 1/2000 | Riedel et al. | |
| 6,032,977 A | 3/2000 | Reh et al. | |
| 6,056,316 A | 5/2000 | Yamaji et al. | |
| 6,073,961 A | 6/2000 | Bailey et al. | |
| 6,082,761 A | 7/2000 | Kato et al. | |
| 6,135,492 A | 10/2000 | Zimmerbeutel et al. | |
| 6,155,596 A | 12/2000 | Nakajima et al. | |
| 6,168,191 B1 | 1/2001 | Webber et al. | |
| 6,170,860 B1 | 1/2001 | Denz et al. | |
| 6,179,324 B1 * | 1/2001 | White et al. | 280/730.2 |
| 6,186,534 B1 | 2/2001 | Heinz | |
| 6,199,898 B1 | 3/2001 | Masuda et al. | |
| 6,220,625 B1 | 4/2001 | Wallner et al. | |
| 6,224,087 B1 * | 5/2001 | Stutz et al. | 280/728.2 |
| 6,237,937 B1 | 5/2001 | Kokeguchi et al. | |
| 6,237,943 B1 * | 5/2001 | Brown et al. | 280/730.2 |
| 6,244,619 B1 * | 6/2001 | Satzger | 280/730.2 |
| 6,250,668 B1 | 6/2001 | Breed et al. | |
| 6,312,010 B1 * | 11/2001 | Heigl | 280/730.2 |
| 6,334,626 B2 * | 1/2002 | Nakajima et al. | 280/730.2 |
| 6,364,349 B1 * | 4/2002 | Kutchey et al. | 280/730.2 |
| 6,394,487 B1 * | 5/2002 | Heudorfer et al. | 280/729 |
| 6,626,456 B2 * | 9/2003 | Terbu et al. | 280/728.2 |
| 2002/0158450 A1 * | 10/2002 | Hoeft et al. | 280/730.2 |

* cited by examiner

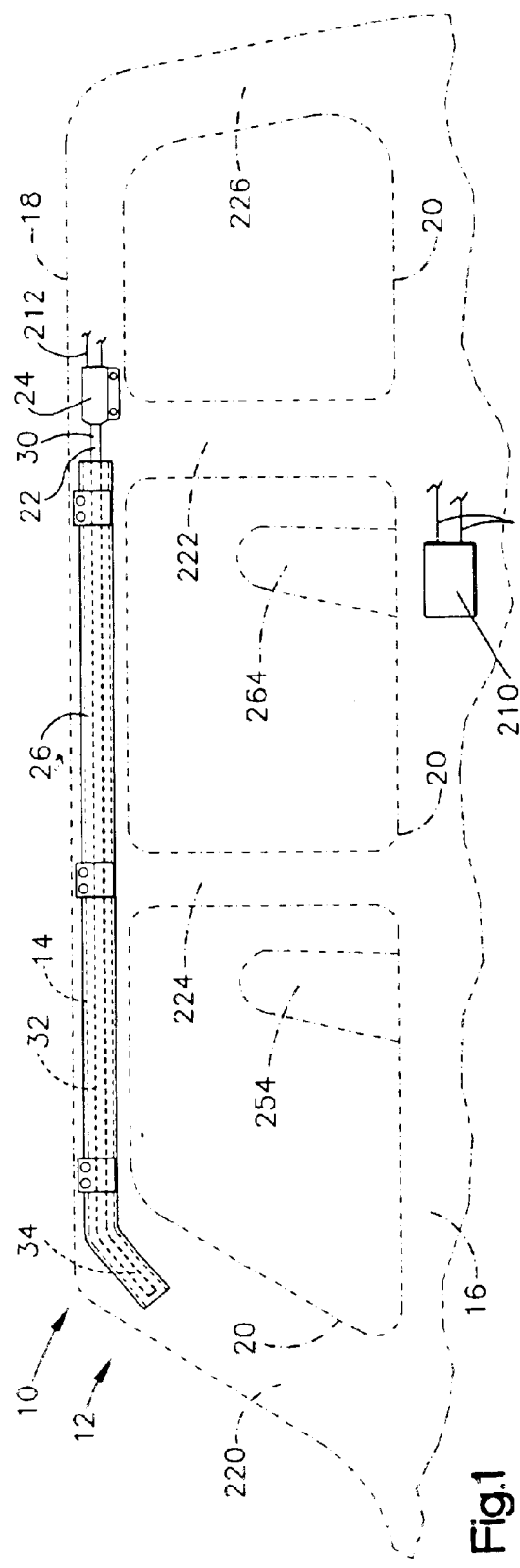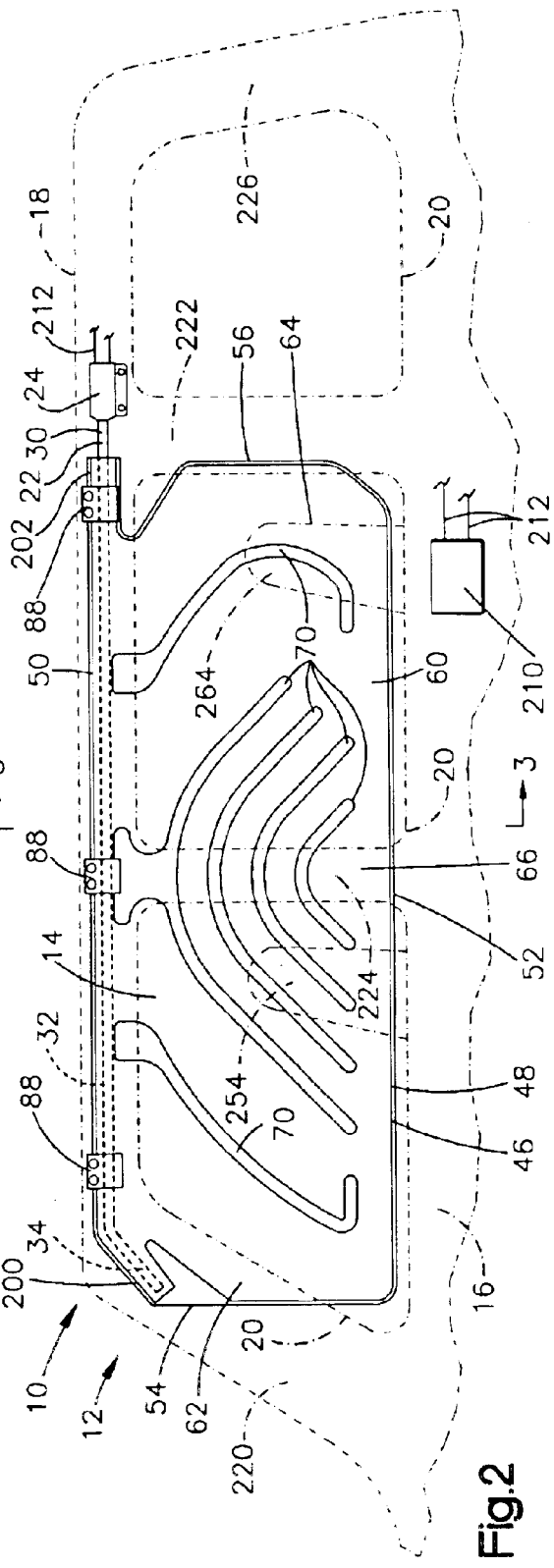
Fig.1
Fig.2

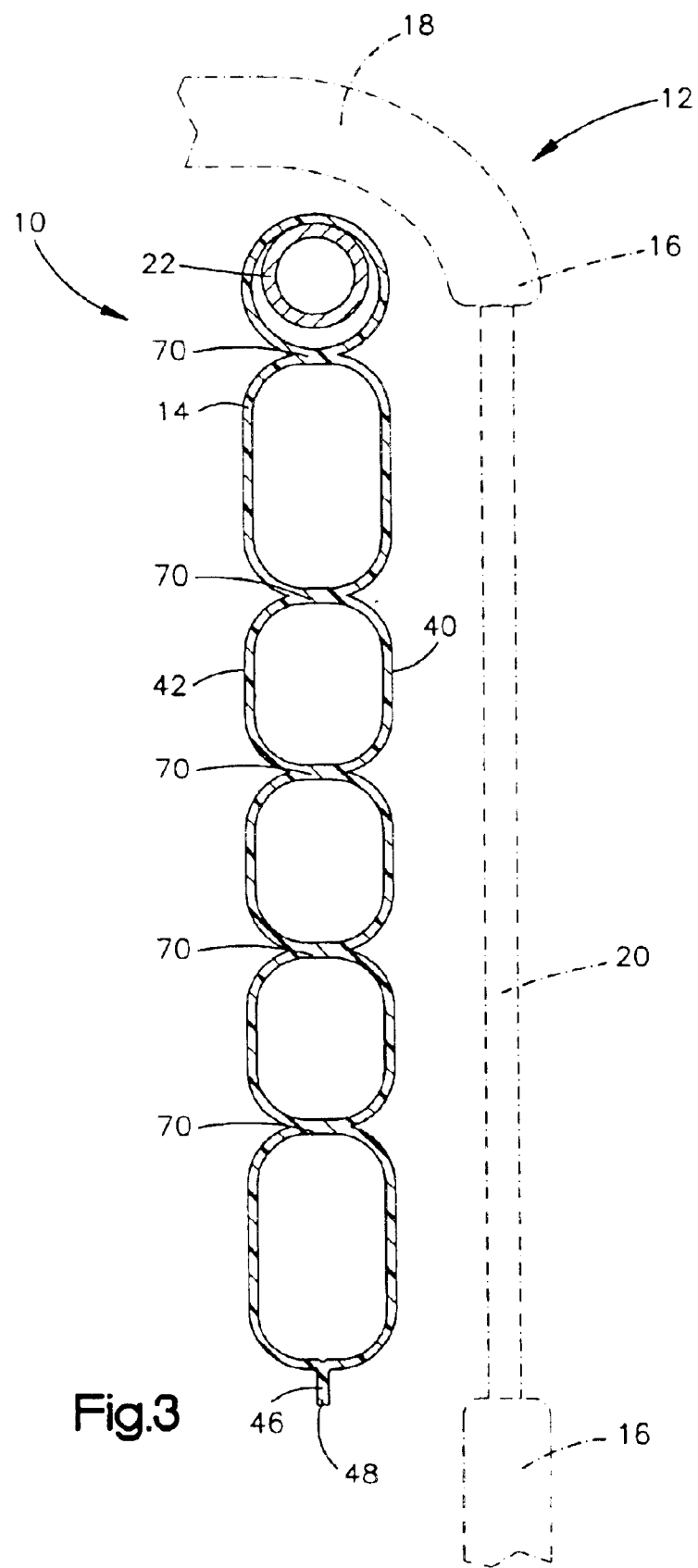

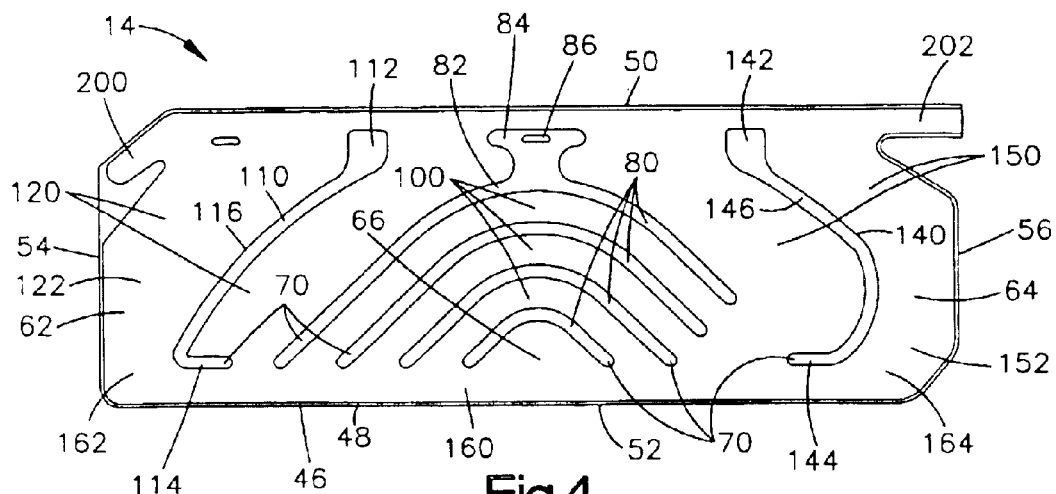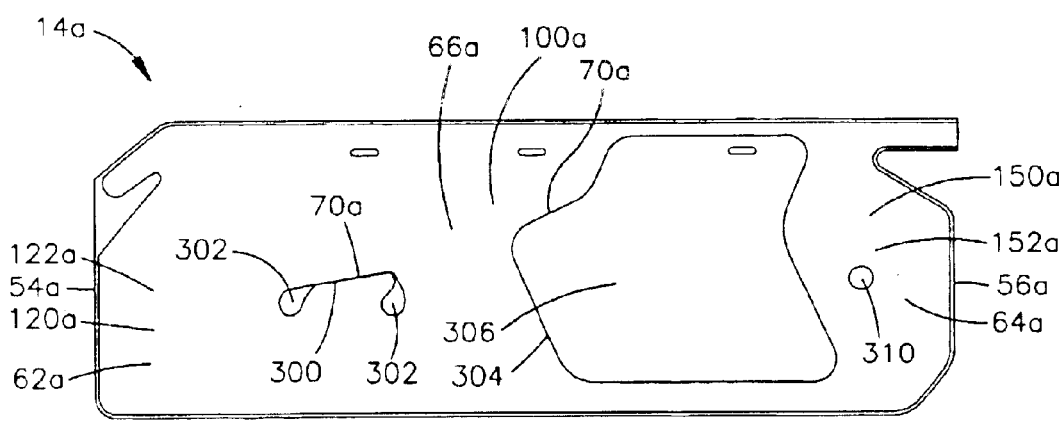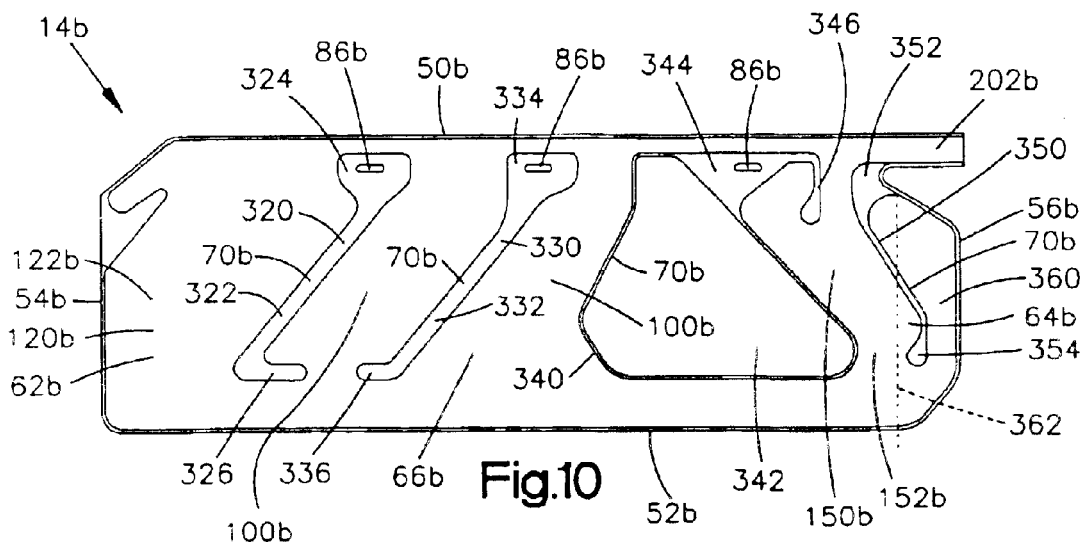

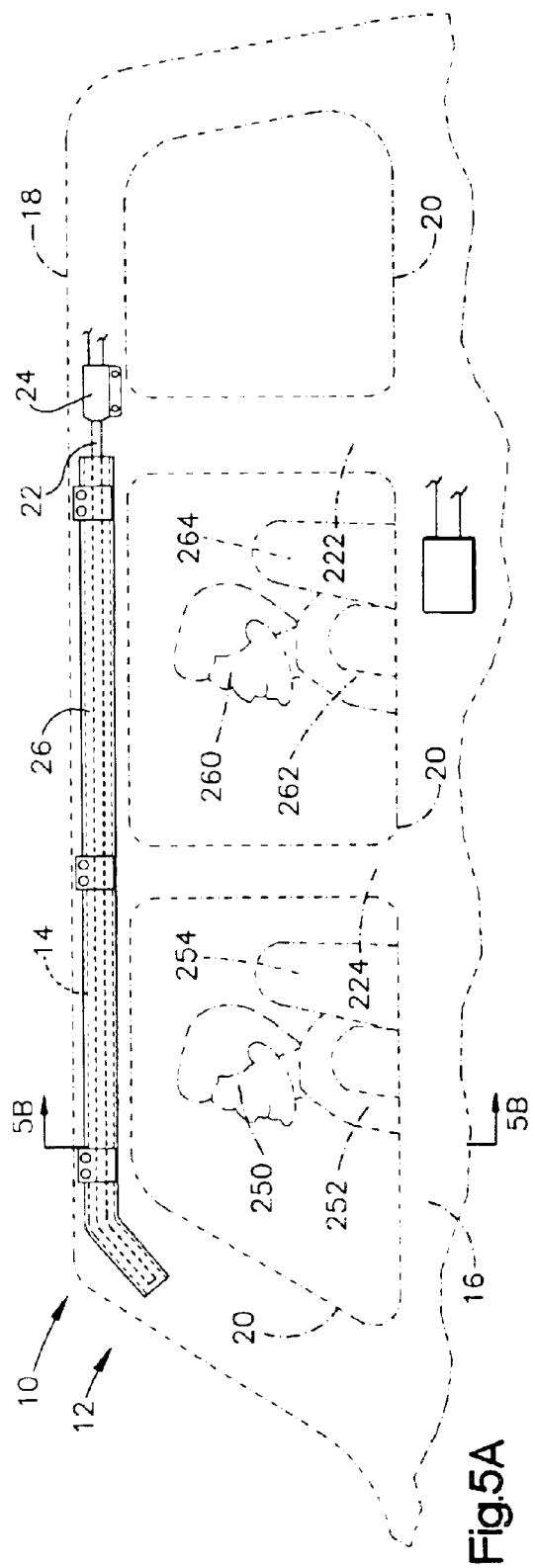
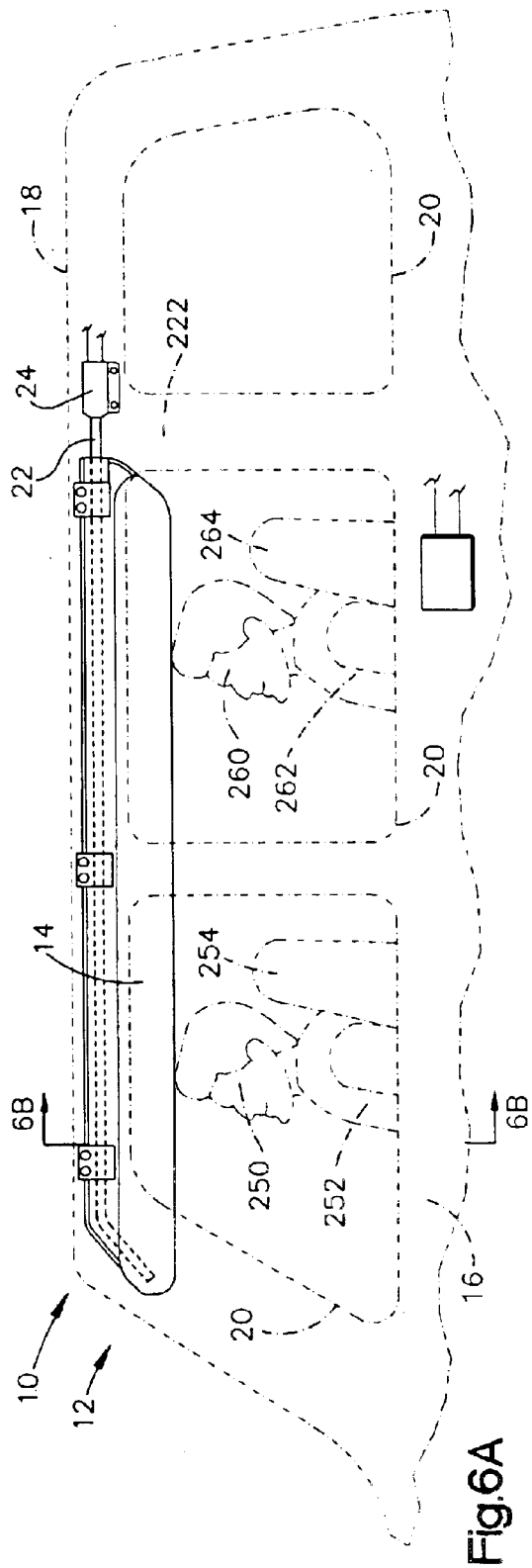

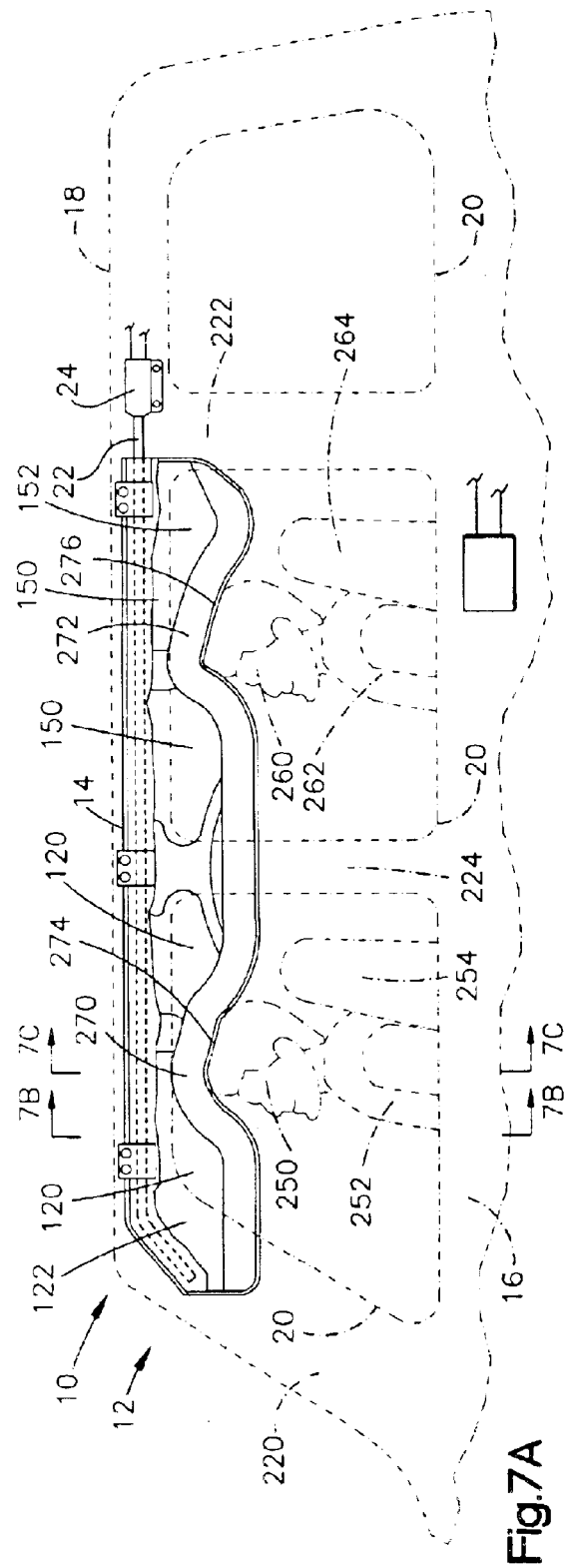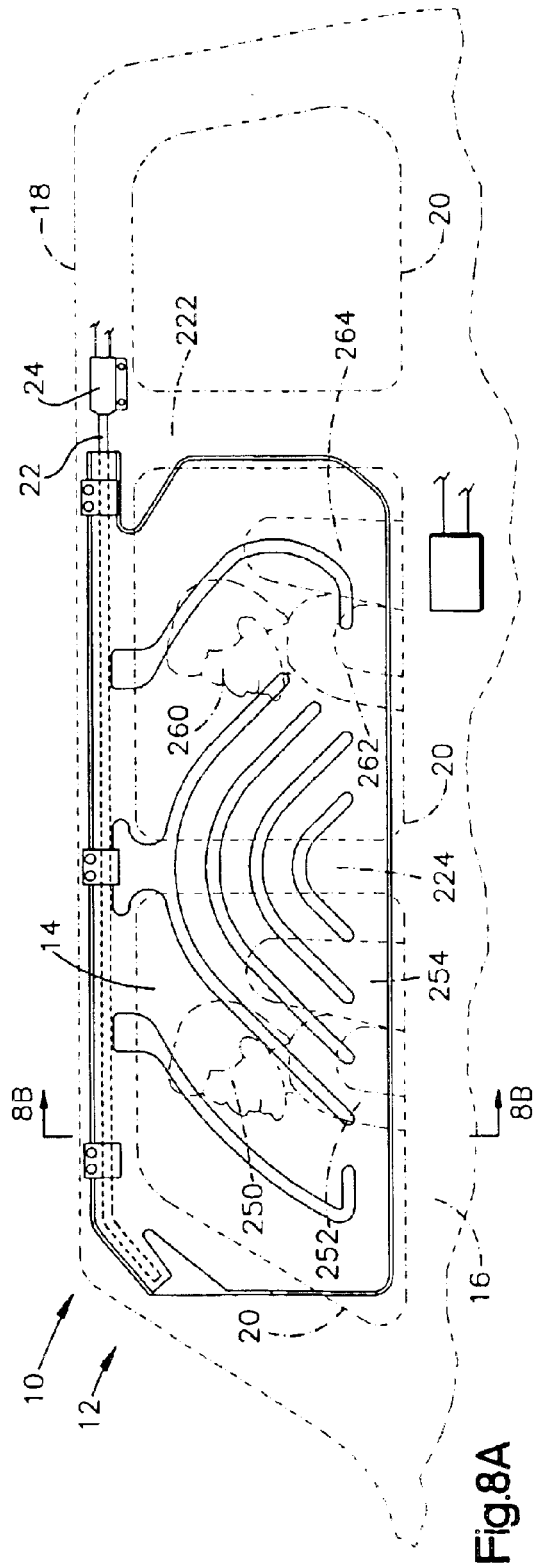

US 6,851,707 B2

INFLATABLE SIDE CURTAIN

RELATED APPLICATIONS

This application is a continuation-in-part of U.S. patent application Ser. No. 09/946,287, filed Sep. 5, 2001, now U.S. Pat. No. 6,431,590, which is a continuation of U.S. patent application Ser. No. 09/672,547, filed Sep. 28, 2000, now abandoned, and a continuation-in-part of U.S. patent application Ser. No. 09/956,227 now U.S. Pat. No. 6,471, 240, filed Sep. 19, 2001, which is a continuation of U.S. patent application Ser. No. 09/579,162, filed May 25, 2000, now abandoned, which is based on Provisional U.S. Application Ser. No. 60/190,199, filed Mar. 17, 2000.

FIELD OF THE INVENTION

The present invention relates to an apparatus for helping to protect an occupant of a vehicle in the event of a side impact to the vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment in the event of a side impact or a vehicle rollover. The inflatable curtain, when inflated, is positioned between a vehicle occupant and the side structure of the vehicle. A known inflatable curtain is inflated by inflation fluid directed from an inflator into the inflatable curtain through a fill tube.

SUMMARY OF THE INVENTION

The present invention relates to an apparatus for helping to protect an occupant of a vehicle that has a side structure and a roof. The apparatus comprises an inflatable vehicle occupant protection device inflatable into a position between the side structure of the vehicle and a vehicle occupant. The inflatable vehicle occupant protection device includes a forwardmost inflatable chamber. The inflatable vehicle occupant protection device is rolled up in an outboard direction into a stored position. An inflation fluid source provides inflation fluid for inflating the inflatable vehicle occupant protection device for at least five seconds.

The inflatable vehicle occupant protection device is adapted to inflate and unroll in a downward direction away from the vehicle roof. A first portion of the inflatable vehicle occupant protection device is adapted to engage an occupant's head positioned against the side structure of the vehicle. The first portion moves the occupant's head laterally in the vehicle away from the side structure and inflates between the side structure of the vehicle and the occupant's head.

The present invention also relates to a method for helping to protect an occupant of a vehicle that has a side structure and a roof, in which a head of the occupant is positioned against the vehicle side structure. The method includes the step of providing an inflatable vehicle occupant protection device that is inflatable into a position between the side structure of the vehicle and a vehicle occupant. The inflatable vehicle occupant protection device includes inflatable first and second portions. The first portion is the forwardmost positioned inflatable portion of the inflatable vehicle occupant protection device. The method also includes the step of providing an inflation fluid source that provides inflation fluid for inflating the inflatable vehicle occupant protection device and maintaining the inflatable vehicle occupant protection device in an inflated condition for at least five seconds.

The method further includes the step of rolling up the inflatable vehicle occupant protection device in an outboard direction towards the vehicle side structure into a stored position. The inflatable vehicle occupant protection device is adapted to inflate and unroll in a downward direction away from the vehicle roof. The second portion is adapted to engage initially the occupant's head positioned against the side structure of the vehicle.

The method further includes the step of directing inflation fluid into the first portion to help initially deploy the first portion forward of and vertically below the top of the occupant's head and adjacent the vehicle side structure before the second portion is deployed vertically below the top of the occupant's head. The second portion is adapted to move the occupant's head away from the vehicle side structure and inflate between the vehicle side structure and the occupant's head.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an apparatus for helping to protect a vehicle occupant illustrating the apparatus in a deflated condition, according to a first embodiment of the invention;

FIG. 2 is a schematic view of the apparatus of FIG. 1 in an inflated condition;

FIG. 3 is a sectional view of the apparatus taken generally along line 3—3 in FIG. 2;

FIG. 4 is a schematic view of a portion of the apparatus of FIGS. 1–3;

FIG. 5A is a schematic view of the apparatus of FIGS. 1–4 prior to actuation of the apparatus;

FIG. 6A is a schematic view of the apparatus of FIGS. 1–4 at a first interval after actuation of the apparatus;

FIG. 7A is a schematic view of the apparatus of FIGS. 1–4 at a second interval after actuation of the apparatus;

FIG. 8A is a schematic view of the apparatus of FIGS. 1–4 at a third interval after actuation of the apparatus;

FIG. 9 is a schematic view of a portion of an apparatus for helping to protect a vehicle occupant illustrating the apparatus in an inflated condition, according to a second embodiment of the invention; and FIG. 10 is a schematic view of a portion of an apparatus for helping to protect a vehicle occupant illustrating the apparatus in an inflated condition, according to a third embodiment of the invention.

DESCRIPTION OF PREFERRED EMBODIMENTS

Figure 5B:
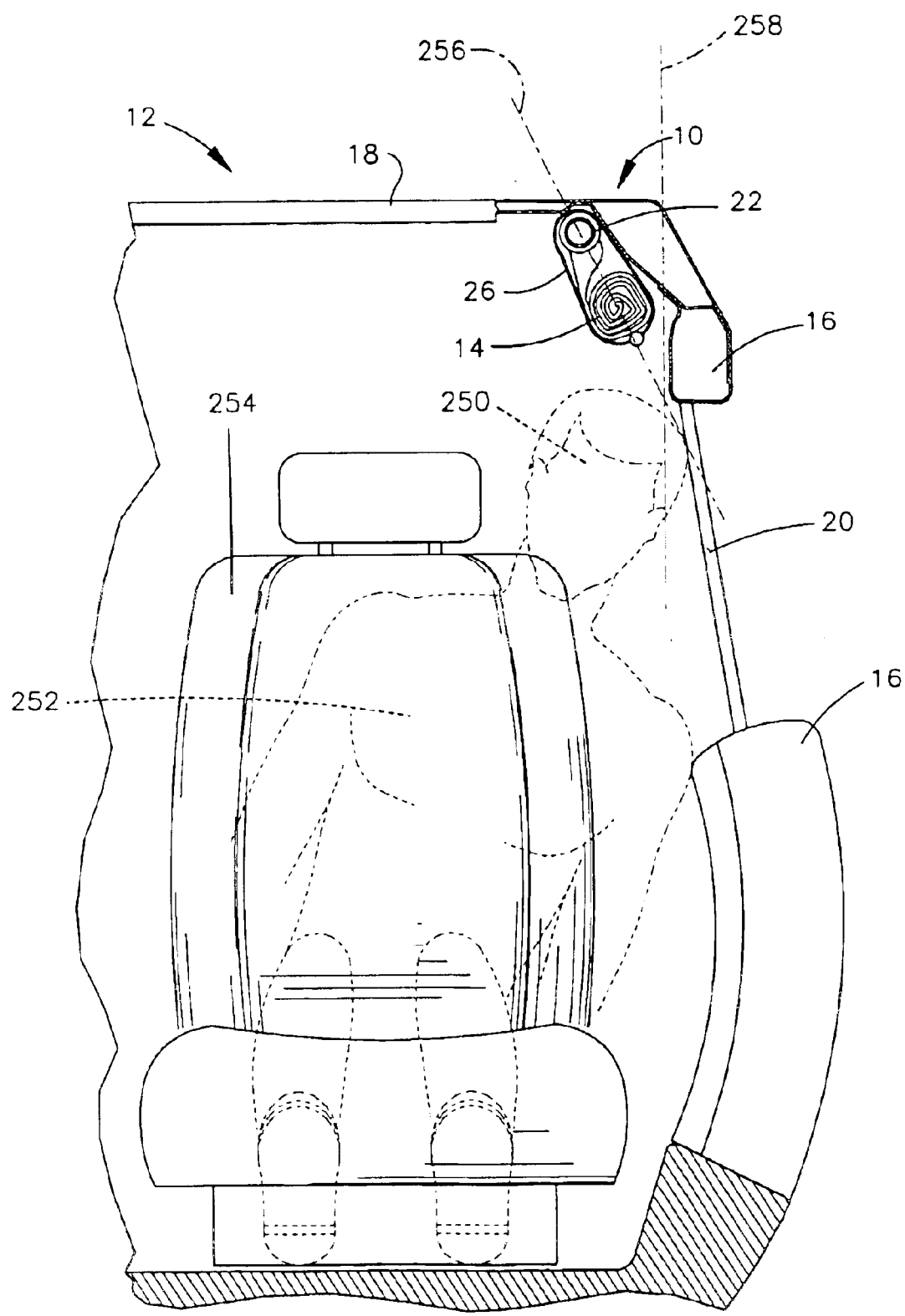
FIG. 5B is a sectional view taken generally along line 5B—5B in FIG. 5A.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and a roof 18 of the vehicle. The roof 18 may be either a standard roof that is fixed in place or a convertible roof that can be moved or removed. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 disposed in the inflatable curtain 14. The second end portion 32 of the fill tube 22 has a plurality of openings (not shown) that provide fluid communication between the fill tube 22 and the inflatable curtain 14. As shown in FIGS. 1 and 2, the second end portion 32 may include an angled portion 34 that extends at an acute angle from the remainder of the fill tube 22.

The inflator 24 is actuatable to provide inflation fluid for inflating the inflatable curtain 14 and maintaining the curtain in an inflated condition for at least five seconds. The inflator 24 preferably contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 22 could be of any suitable type or construction for supplying a medium for inflating the inflatable curtain 14 and maintaining the curtain in an inflated condition for at least five seconds.

The apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20. According to the present invention, the inflatable curtain 14 is placed in a stored position in the housing 26 by rolling up the curtain in an outboard roll direction. The lower edge 52 of the inflatable curtain 14 is rolled in an outboard direction toward the vehicle side structure 16 about an axis that extends generally parallel to the lower edge of the curtain. The stored position in which the inflatable curtain 14 is rolled up in the outboard direction is best illustrated in FIG. 5b.

Referring to FIG. 3, the inflatable curtain 14 comprises first and second panels 40 and 42 that are arranged in an overlying manner. The first and second panels 40 and 42 are interconnected to form a perimeter connection 46 (FIGS. 2 and 3) that extends along a perimeter 48 of the panels. The first and second panels 40 and 42 are also interconnected to form connections 70 within the perimeter 48 of the inflatable curtain 14.

In a preferred construction of the inflatable curtain 14, the perimeter connection 46 and the connections 70 are formed by weaving the panels 40 and 42 together. In alternative constructions of the inflatable curtain 14, means such as stitching, dielectric sealing, ultrasonic bonding, heat sealing, and adhesives may be used to interconnect the first and second panels 40 and 42 in order to form the perimeter connection 46 and the connections 70.

In the preferred construction of the inflatable curtain 14, the curtain is formed by weaving the first and second panels 40 and 42 simultaneously while also interweaving the perimeter connection 46 and the connections 70 as single layers of fabric. This can be accomplished by using a Jacquard or Dobby weaving machine. The weaving machines are pre-programmed to weave the first and second panels 40 and 42 along with the perimeter connection 46 and connections 70 at the same time. No intermediate steps are required.

In an alternative construction of the inflatable curtain 14, the curtain may be formed by interconnecting two separate fabric pieces together along the perimeter connection 46 and the connections 70. As a further alternative, a single piece of fabric may be folded over to form the overlying first and second panels 40 and 42. In this latter alternative, the fold is part of the perimeter connection 46 of the inflatable curtain 14.

Preferably, the inflatable curtain 14 is constructed of a woven fabric, such as nylon, that is coated with a gas impermeable material, such as urethane or silicone. The inflatable curtain 14 thus may have a substantially gas-tight construction. Other materials, such as elastomers, plastic films, or combinations thereof, may also be used to construct the inflatable curtain 14, in which case the curtain may have a non-woven construction. The materials used to construct the inflatable curtain 14 may also be single or multi-layered materials.

The first and second panels 40 and 42, the perimeter connection 46, and the connections 70 may be coated using a laminate film, slurry, and/or a spray coating, such as silicone, urethane, or other known suitable materials, in order to achieve a substantially gas-tight construction. This helps to prevent gas from permeating directly through the first and second panels 40 and 42, the perimeter connection 46, and the connections 70.

The perimeter 48 (FIG. 2) of the inflatable curtain 14 is defined by upper and lower edges 50 and 52, respectively, of the curtain and front and rear edges 54 and 56, respectively, of the curtain that are spaced apart horizontally along the upper and lower edges. The perimeter connection 46 (FIG. 2) defines an inflatable volume 60 of the inflatable curtain 14.

The front and rear edges 54 and 56 of the inflatable curtain 14 partially define front and rear portions 62 and 64, respectively, that are spaced apart horizontally along the upper and lower edges 50 and 52 and extend between the upper and lower edges. A middle portion 66 of the inflatable curtain 14 is positioned between the front and rear portions 62 and 64 of the inflatable curtain 14 and extends between the upper and lower edges 50 and 52 of the curtain.

As illustrated in FIG. 2, the front and rear edges 54 and 56 extend between the upper and lower edges 50 and 52. The front and rear edges 54 and 56 could, however, be omitted and the upper and lower edges 50 and 52 could be curved and extended until they intersect, in which case the front and rear portions 58 and 60 would be partially defined by the intersecting upper and lower edges.

Referring to FIG. 4, the inflatable curtain 14 includes four middle connections 80 located in the middle portion 66 of the curtain. The middle connections 80 are generally arc-shaped, concentric, and are positioned facing concavely downward, as viewed in FIG. 4, toward the lower edge 52 of the inflatable curtain 14. A first middle connection 82 includes a generally T-shaped portion 84 that extends towards the upper edge 50 of the inflatable curtain 14 from a position proximate the apex of the arc-shaped first middle connection. The portion 84 may include an aperture 86 for receiving a fastening device 88 (FIG. 2), such as a clamp, for connecting the inflatable curtain 14 and the fill tube 22 to the vehicle 12.

The middle connections 80 help to define three inflatable middle chambers 100 located in the middle portion 66 of the inflatable curtain 14. The middle chambers 100 are generally arc-shaped, concentric, and are positioned facing concavely downward, as viewed in FIG. 4, toward the lower edge 52 of the inflatable curtain 14.

The inflatable curtain 14 also includes a front connection 110 located in the front portion 62 of the curtain. The front connection 110 includes an upper end portion 112, a lower end portion 114 and a middle portion 116 that extends between the upper and lower end portions. The upper end portion 112 is positioned near the upper edge 50 of the inflatable curtain 14 and extends generally parallel to the upper edge of the curtain. The upper end portion 112 may include an aperture (not shown) for receiving a fastening device. The lower end portion 114 is positioned near the lower edge 52 of the inflatable curtain 14 and extends generally parallel to the lower edge of the curtain towards the middle portion 66 of the curtain. The middle portion 116 of the front connection 110 is curved and extends generally diagonally between the upper and lower end portions 112 and 114.

The front connection 110, perimeter connection 46, and the first middle connection 82 help to define two inflatable front chambers 120 located in the front portion 62 of the inflatable curtain 14. The front chambers 120 extend generally diagonally from near the upper edge 50 of the inflatable curtain 14 to near the lower edge 52 of the curtain. The front chambers 120 include a forwardmost chamber 122 partially defined by the perimeter connection 46 and the front connection 110. The forwardmost chamber 122 is located forward of all of the remaining inflatable chambers of the inflatable curtain 14.

The inflatable curtain 14 also includes a rear connection 140 located in the rear portion 64 of the curtain. The rear connection 140 includes an upper end portion 142, a lower end portion 144 and a middle portion 146 that extends between the upper and lower end portions. The upper end portion 142 is positioned near the upper edge 50 of the inflatable curtain 14 and extends generally parallel to the upper edge of the curtain. The upper end portion 142 may include an aperture (not shown) for receiving a fastening device. The lower end portion 144 is positioned near the lower edge 52 of the inflatable curtain 14 and extends generally parallel to the lower edge of the curtain towards the middle portion 66 of the curtain. The middle portion 146 of the rear connection 140 is curved and extends generally diagonally between the upper and lower end portions 142 and 144.

The rear connection 140, perimeter connection 46, and the first middle connection 82 help to define two inflatable rear chambers 150 located in the rear portion 64 of the inflatable curtain 14. The rear chambers 150 extend from near the upper edge 50 of the inflatable curtain 14 to near the lower edge 52 of the curtain. The rear chamber 150 adjacent the middle portion 66 extends generally diagonally, whereas the rear chamber adjacent the rear edge 56 extends in a generally curved manner. The rear chambers 150 include a rearwardmost chamber 152 partially defined by the perimeter connection 46 and the rear connection 140. The rearwardmost chamber 152 is located rearward of all of the remaining inflatable chambers of the inflatable curtain 14.

The front connection 110, middle connections 80 and rear connection 140 help define an inflatable bottom chamber 160 that extends along the length of the inflatable curtain 14 between the lower edge 52 and the connections. The bottom chamber 160 provides fluid communication between the front chambers 120, middle chambers 100, and rear chambers 150. The forwardmost chamber 122 includes a passage 162 that provides fluid communication between the forwardmost chamber and the bottom chamber 160. The rearwardmost chamber 152 includes a passage 164 that provides fluid communication between the rearwardmost chamber and the bottom chamber 160.

As illustrated in FIGS. 2 and 4, the inflatable curtain 14 may include a pocket 200 for receiving the angled portion 34 of the second end portion 32 of the fill tube 22. The pocket 200 is defined by a portion of the perimeter connection 46 adjacent the intersection of the front edge 54 and the upper edge 50 of the inflatable curtain 14. The pocket 200 surrounds the angled portion 34 of the fill tube 22 and forms a snug fit with the fill tube. The pocket 200 thus may help to position the fill tube 22 in the inflatable curtain 14 and helps to maintain the position of the fill tube relative to the curtain.

The inflatable curtain 14 may also include an opening 202 for supporting the first end portion 30 of the fill tube 22. The opening 202 is positioned adjacent the intersection of the rear edge 56 and the upper edge 50 of the inflatable curtain 14. The opening 202 is defined by portions of the perimeter connection 46 adjacent the intersection of the upper edge 50 and the rear edge 52 of the inflatable curtain 14. The opening 202 receives the fill tube 22 when the fill tube is inserted into the inflatable curtain 14. When the fill tube 22 is fully inserted in the inflatable curtain 14, the portions of the curtain that define the opening 202 encircle the first end portion 30 of the fill tube 22 and form a snug fit with the fill tube. The opening 202 thus may help to position the fill tube 22 in the inflatable curtain 14 and helps to maintain the position of the fill tube relative to the curtain.

The upper end portions 112 and 142 of the front and rear connections 110 and 140 may be spaced apart from the upper edge 50 of the inflatable curtain 14 a distance that is preferably slightly larger than the diameter of the fill tube 22. The upper end portions 112 and 142 thus may help guide the fill tube 22 into the inflatable curtain 14 when the tube is inserted into the curtain. The upper end portions 112 and 142 also may help to position the fill tube 22 in the inflatable curtain 14 and help to maintain the position of the fill tube relative to the curtain.

The vehicle 12 includes a sensor mechanism 210 (shown schematically in FIGS. 1 and 2) for sensing a side impact to the vehicle 12 and/or a rollover of the vehicle 12. The sensor mechanism 210 actuates the inflator 24 in response to the sensing of a side impact or a vehicle rollover.

In the event of a rollover of the vehicle 12 or a side impact to the vehicle for which inflation of the inflatable curtain 14 is desired, the sensor mechanism 210 provides an electrical signal over lead wires 212 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1)

opens and the inflatable curtain 14 (FIG. 2) inflates and unrolls in a direction away from the roof 18 in a downward direction as shown in the drawings and in a downward direction with respect to the direction of forward travel of the vehicle 12 into the inflated condition illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the first panel 40 (FIG. 3) is positioned adjacent the side structure 16 of the vehicle 12. The upper edge 50 (FIG. 2) of the inflatable curtain 14 is positioned adjacent the intersection of the roof 18 and the side structure 16 of the vehicle 12. The front edge 54 of the inflatable curtain 14 is positioned adjacent an A pillar 220 of the vehicle 12. The rear edge 56 of the inflatable curtain 14 is positioned adjacent a C pillar 222 of the vehicle 12. The inflatable curtain 14 extends between the A pillar 220 and the C pillar 222 of the vehicle 12 and overlies at least a portion of the A pillar, C pillar, and a B pillar 224 of the vehicle.

It will be recognized by those skilled in the art that the inflatable curtain may have alternative configurations. For example, in the illustrated embodiment, the inflatable curtain 14 extends between the A pillar 220 and the C pillar 222 of the vehicle 12. The inflatable curtain 14 could, however, extend between the A pillar 220 and the B pillar 224 only or between the B pillar and the C pillar 222 only. Also, the inflatable curtain 14 could extend between the A pillar 220 and a D pillar 226 of the vehicle.

As the inflatable curtain 14 is inflated, inflation fluid is directed from the fill tube 22 into the front and rear chambers 120 and 150. In the embodiment illustrated in FIGS. 1–4, the inflation fluid begins to inflate the front and rear chambers 120 and 150 before the middle chambers 100 begin to inflate. In fact, the front and rear chambers 120 and 150 may be substantially inflated before the middle chambers 100 begin to inflate. Thus, in the embodiment of FIGS. 1–4, the front and rear portions 62 and 64 of the inflatable curtain 14 are inflated before the middle portion 66 of the curtain is inflated.

As the inflatable curtain 14 is inflated, inflation of the front and rear portions 62 and 64 causes the curtain to move in the downward direction away from the vehicle roof 18. Inflation of the front and rear portions 62 and 64 causes the front, middle and rear portions to deploy substantially evenly along the length of the inflatable curtain 14. The lower edge 52 of the inflatable curtain 14 is thus deployed substantially evenly long the length of the curtain.

Those skilled in the art will recognize that an occupant of the vehicle may be positioned against the vehicle side structure 16 at the time the inflatable curtain 14 is inflated. This is illustrated in FIG. 5B. As shown in FIG. 5B, the head 250 of a vehicle occupant 252 is positioned against the vehicle side structure 16. In particular, the occupant's head 250 is positioned against a side window 20 of the vehicle.

According to the present invention, the construction of the inflatable curtain 14 and the manner in which the curtain is placed in the stored position helps to inflate the curtain between the vehicle occupant and the vehicle side structure 16 when the occupant 252 is positioned against the side structure at the time of inflation. In particular, the construction of the front chambers 120, middle chambers 100, rear chambers 150, and bottom chamber 160, in conjunction with the outboard roll by which the curtain is placed in the stored position, helps to inflate the curtain between the vehicle occupant and the vehicle side structure 16.

According to the present invention, the forwardmost chamber 122 and the rearwardmost chamber 152 are among the chambers initially inflated upon actuation of the inflator 24. Some or all of the remaining front chambers 120, middle chambers 100, and rear chambers 150 may also be initially inflated along with the forwardmost and rearwardmost chambers 122 and 152 upon actuation of the inflator 24. In the embodiment illustrated in FIGS. 1–4, the forwardmost and rearwardmost chambers 122 and 152 are initially inflated along with the remaining front and rear chambers 120 and 150. As stated above, the middle chambers 100 are inflated subsequent to inflation of the front and rear chambers 120 and 150.

Referring to FIGS. 5A and 5B, the apparatus 10 is illustrated prior to actuation of the inflator 24. A front seat occupant 252 is positioned in a front seat 254 of the vehicle 12 and a rear seat occupant 262 is positioned in a rear seat 264 of the vehicle. The head 250 of the front seat occupant 252 is positioned against a side window 20 of the vehicle side structure 16. This is best illustrated in FIG. 5B. The head 260 (FIG. 5A) of the rear seat occupant 262 is positioned against a side window 20 of the vehicle side structure 16. The occupant's heads 250 and 260, however, could be positioned against other parts of the side structure 16, such as the B pillar 224 or C pillar 222, respectively. Although the rear seat occupant 262 is not illustrated in FIG. 5B, it will be appreciated that the position of the rear seat occupant may be identical or substantially similar to the position of the front seat occupant 252.

The apparatus 10 is illustrated in FIG. 5B in the stored position in which the inflatable curtain 14 is rolled up in the outboard direction and placed in the housing 26. In FIG. 5B, certain parts of the vehicle 12 have been omitted for clarity. For example, the vehicle 12 may include a headliner (not shown), which could extend along the roof 18 and overlie the roof and the apparatus 10 when the apparatus is in the stored position.

Preferably, the inflatable curtain 14 has an angled orientation relative to the vehicle side structure 16 and relative to a vertical direction in the vehicle 12. In the embodiment illustrated in FIG. 5B, the inflatable curtain 14 is positioned along a centerline 256 that extends transverse to the vehicle side structure 16 and to a vertical direction indicated generally by the line labeled 258. Preferably, the angle between the centerline 256 and the line 258 is about thirty degrees. The centerline 256 could, however, extend at some other angle relative to the line 258. The angle between the centerline 256 and the line 258 depends partially on vehicle space limitations and the architecture of the vehicle 12.

Figure 6B:
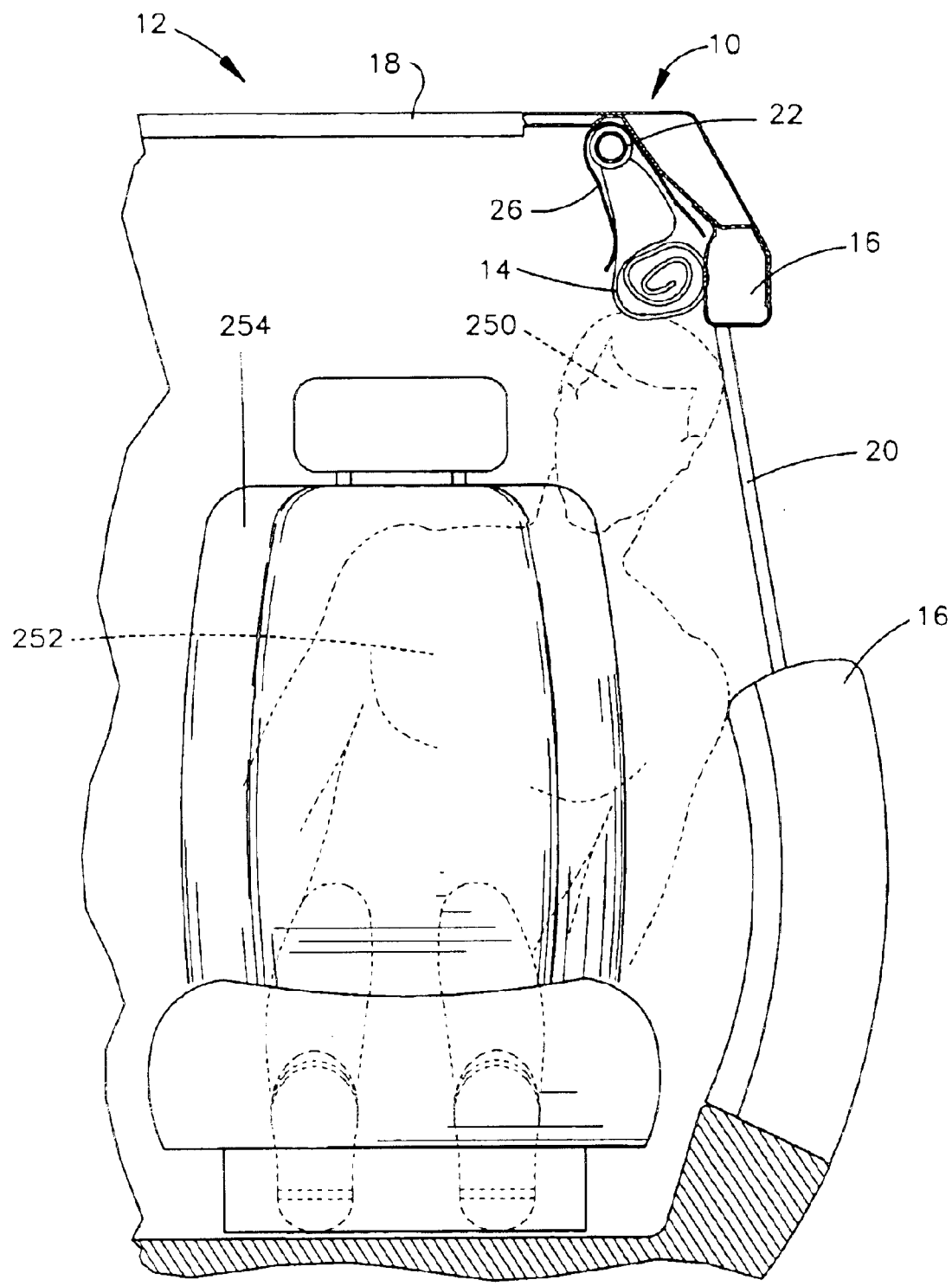
FIG. 6B is a sectional view taken generally along line 6B—6B in FIG. 6A.

Referring to FIGS. 6A and 6B, upon actuation of the inflator 24, the housing 26 opens and the inflatable curtain begins to inflate in the downward direction away from the vehicle roof 18. The downward direction preferably extends generally along the centerline 256 such that the inflatable curtain 14 inflates at an acute angle towards the vehicle side structure 16. The inflatable curtain 14 could, however, inflate at some other angle or vertically in the vehicle 12 depending on the orientation of the curtain relative to the vehicle. As the inflatable curtain 14 is inflated, the curtain unrolls in an outboard direction. The front connection 110 (FIG. 4) helps direct inflation fluid into the forwardmost chamber 122 and the rear connection 140 helps direct inflation fluid into the rearwardmost chamber 152. When the inflatable curtain 14 inflates a given distance in the downward direction, the curtain comes into contact with the front seat occupant's head 250 and the rear seat occupant's head 260. This is illustrated in FIGS. 6A and 6B.

Referring to FIGS. 7A–7D, as the inflatable curtain 14 continues to inflate, respective portions 270 and 272 of the curtain come into contact with the occupants' heads 250 and 260 and are blocked against deployment in the downward direction. In the embodiment illustrated in FIGS. 7A–7D, the portion 270 includes portions of the front chambers 120 and middle chambers 100. The portion 272 includes portions of the rear chambers 150, and the middle chambers 100. The portions 270 and 272, however, include only a small portion of the forwardmost and rearwardmost chambers 122 and 152, respectively. The forwardmost chamber 122 and the rearwardmost chamber 152 are thus substantially free from being blocked against deployment in the downward direction by the occupants' heads 250 and 260. When the portions 270 and 272 contact the occupants' heads 250 and 260 and are blocked against downward movement, the forwardmost chamber 122 and the rearwardmost chamber 152 continue to inflate and deploy in the downward direction, vertically below the top of the occupants' heads 250 and 260, respectively.

Figure 7B:
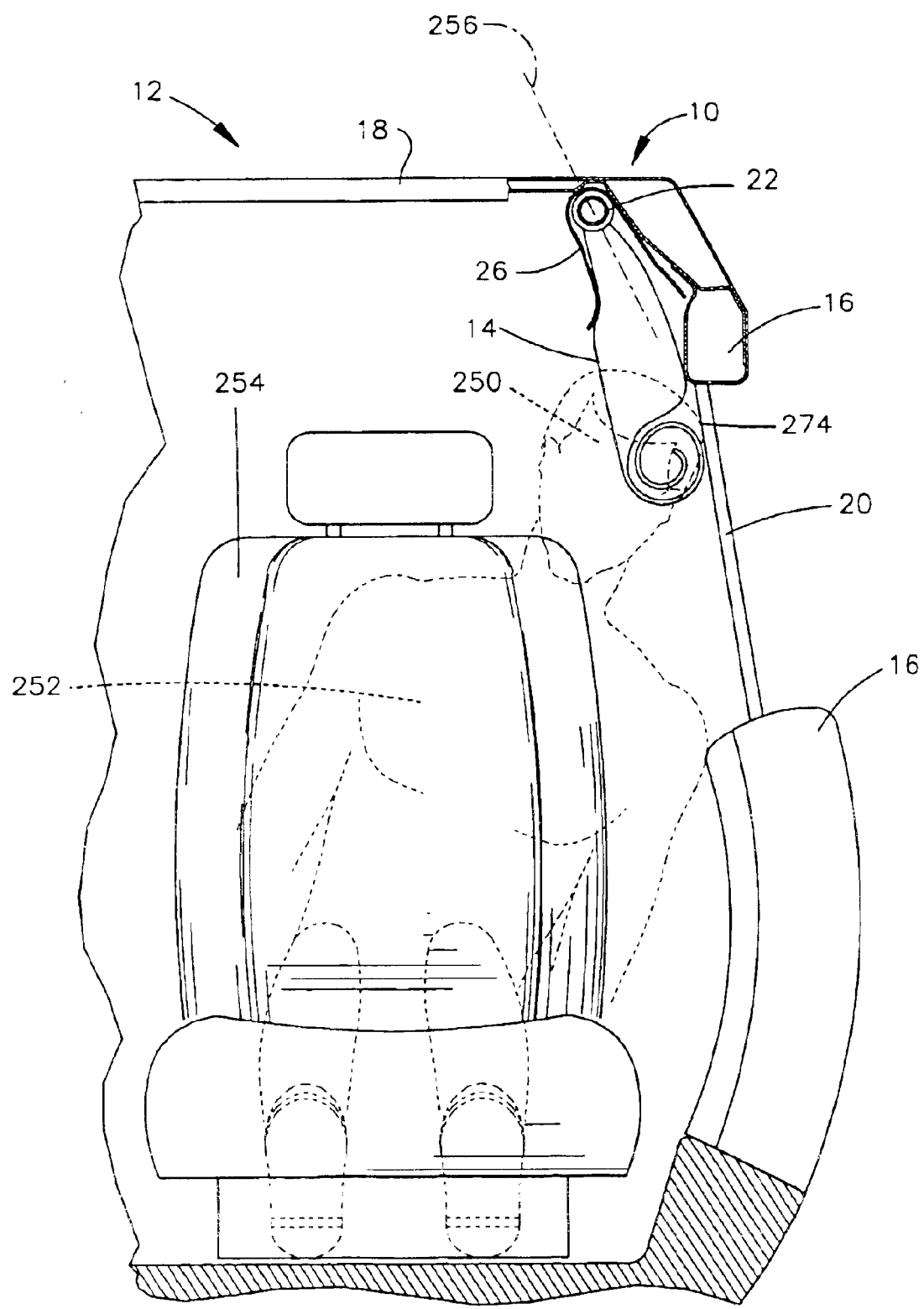
FIG. 7B is a sectional view taken generally along line 7B—7B in FIG. 7A.
Figure 7C:
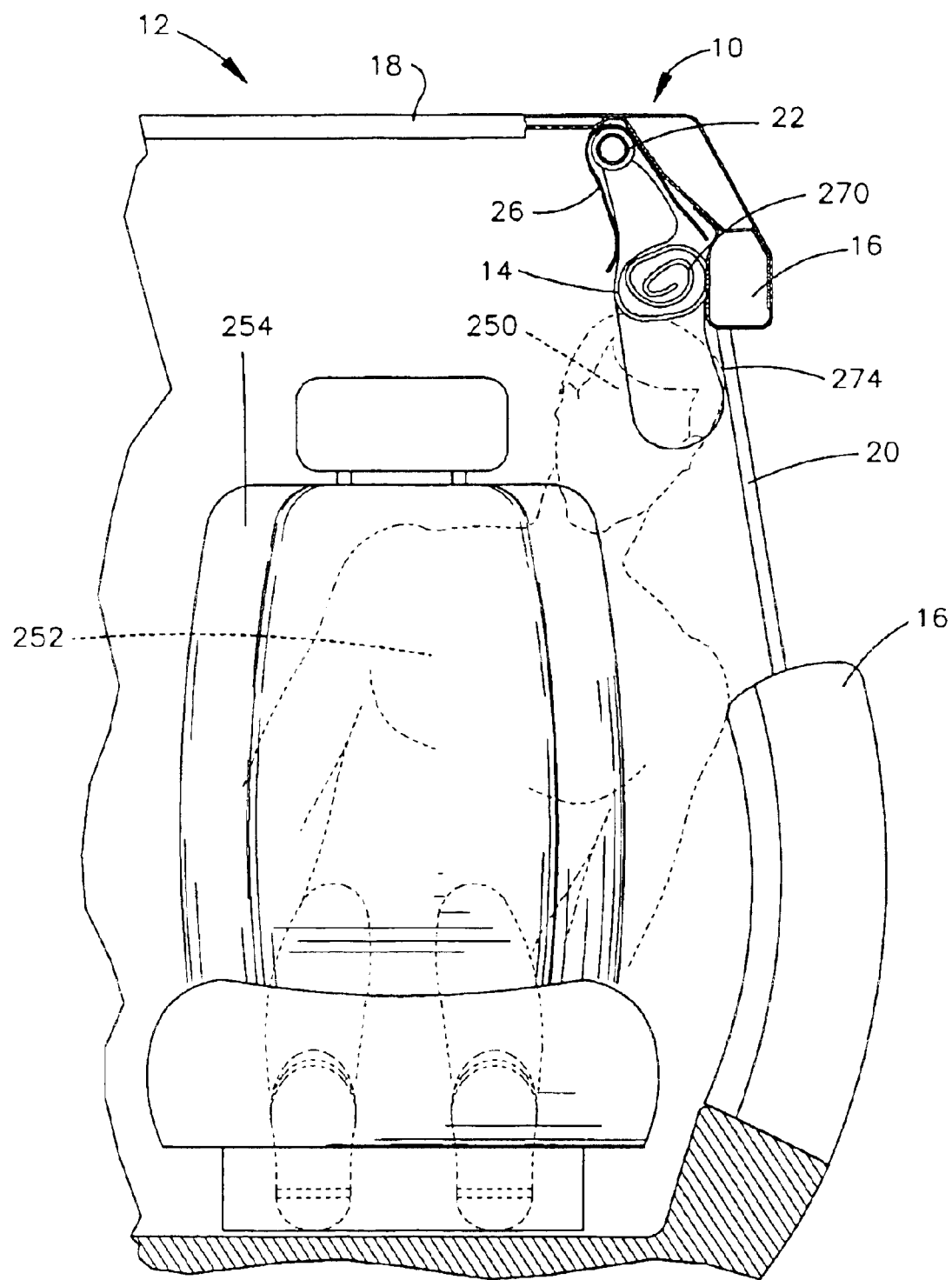
FIG. 7C is a sectional view taken generally along line 7C—7C in FIG. 7A.
Figure 7D:
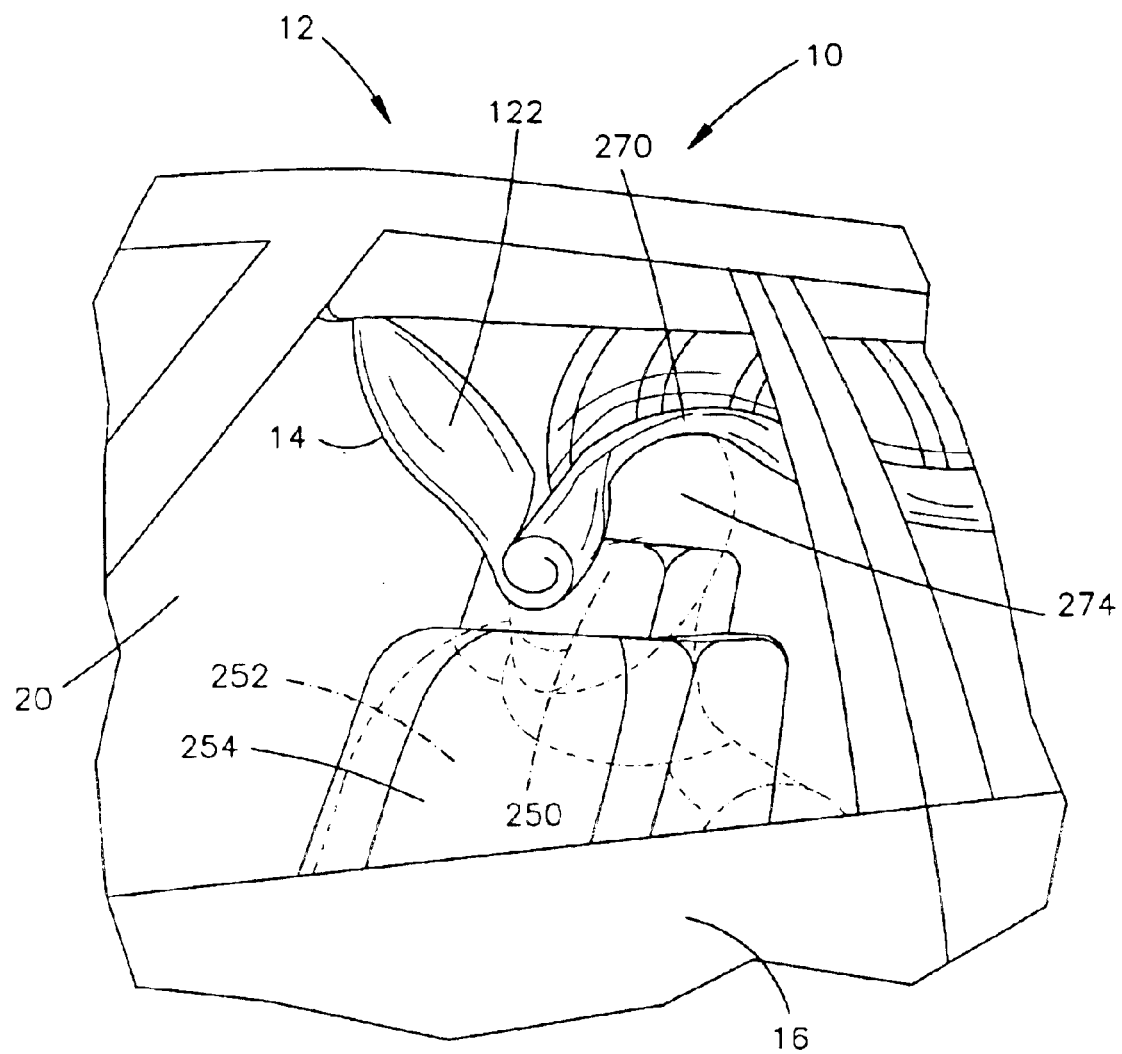
FIG. 7D is a schematic perspective view of a portion of the apparatus of FIG. 7A.

As the inflatable curtain 14 continues to inflate and unroll, the portions 270 and 272 are urged in the outboard direction towards the vehicle side structure 16. The portions 270 and 272 are urged to move in the outboard direction toward the vehicle side structure 16 by the inflation of the forwardmost and rearwardmost chambers 122 and 152 in the downward direction along the centerline 256 and by the inflatable curtain 14 unrolling in the outboard direction. The portions 270 and 272 unroll in the outboard direction and roll over or move around the occupants' heads 250 and 260 towards the vehicle side structure 16. The portions 270 and 272 engage the occupants' heads 250 and 260 and the vehicle side structure 16 at or near respective locations 274 and 276 where the occupants' heads engage the side structure 16. This is best illustrated in FIG. 7C. The locations 274 and 276 form a space between the occupants' heads 250 and 260 and the side structure 16 having a generally concave arrangement facing upward in the vehicle 12 towards the vehicle roof 18.

The forwardmost chamber 122 (FIGS. 7A–7D), inflating downwardly and unrolling in an outboard direction, and being positioned in front of and vertically below the top of the front seat occupant's head 250, urges the portion 270 into the location 274, thus forcing or wedging the portion 270 between the front seat occupant's head and the vehicle side structure 16. This helps to resist movement of the inflatable curtain 14 away from the side structure 16 of the vehicle 12 and thus helps to prevent the curtain from inflating inboard of the front seat occupant 252.

The rearwardmost chamber 152, inflating downwardly and unrolling in an outboard direction, and being positioned rearward of and vertically below the top of the rear seat occupant's head 260, urges the portion 272 into the location 276, thus forcing or wedging the portion 272 between the rear seat occupant's head and the vehicle side structure 16. This helps to resist movement of the inflatable curtain 14 away from the side structure 16 of the vehicle 12 and thus helps to prevent the curtain from inflating inboard of the rear seat occupant 262.

As the inflatable curtain 14 continues to inflate and unroll, the curtain continues to move in the downward direction. The portions 272 and 274 of the inflating curtain 14, being forced or wedged between the occupants' heads 250 and 260 and the vehicle side structure 16, moves the occupants' heads away from the side structure. The forwardmost and chamber 122, inflating in front of the front seat occupant's head 250 is substantially unobstructed from deployment.

The rearwardmost and chamber 152, inflating rearward of the rear seat occupant's head 250, is substantially unobstructed from deployment. The forwardmost and rearwardmost chambers 122 and 152, being substantially unobstructed from deployment, allow substantially unobstructed flow of inflation fluid through the passages 162 and 164, respectively, into the bottom chamber 160. The bottom chamber 160 may thus be inflated rearwardly from the forwardmost chamber 122 between the front seat occupants' head 250 and the vehicle side structure 16 and thus may help move the front seat occupant's head laterally in the vehicle away from the side structure. Also, the bottom chamber 160 may be inflated forwardly from the rearwardmost chamber 152 between the rear seat occupants' head 260 and the vehicle side structure 16 and thus may help move the rear seat occupant's head laterally in the vehicle away from the side structure. The inflatable curtain 14 is thus deployed into the inflated condition wherein the curtain is positioned between the front and rear seat occupants 252 and 262 and the vehicle side structure 16. This is illustrated in FIGS. 8A and 8B.

Figure 8B:
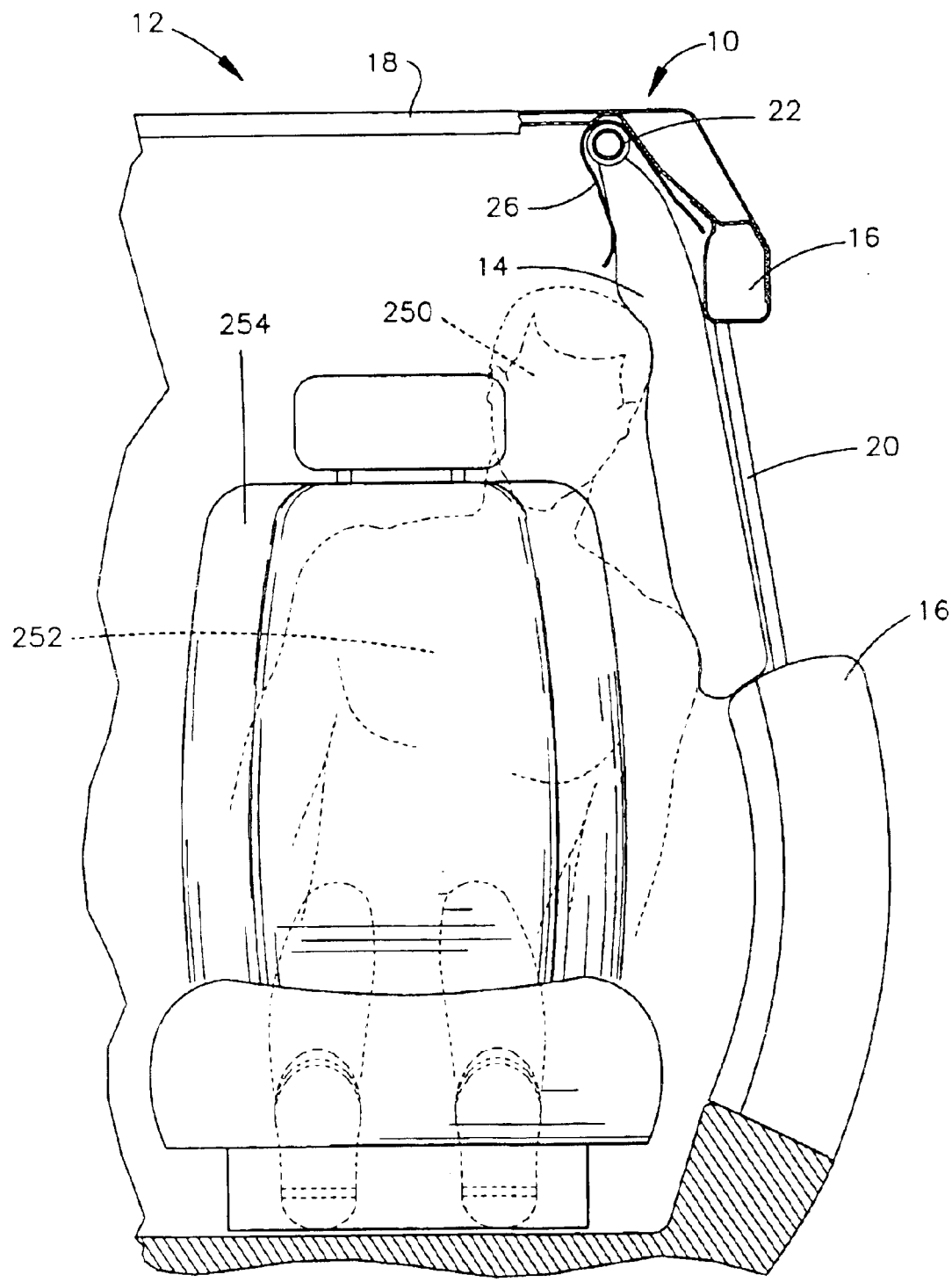
FIG. 8B is a sectional view taken generally along line 8B—8B in FIG. 8A.

The inflatable curtain 14, when in the inflated condition of FIGS. 8A and 8B, helps to protect the front and rear seat occupants 252 and 262 in the event of a vehicle rollover or a side impact to the vehicle 12. The connections 70 help to limit the thickness of the inflated inflatable curtain 14 and help to reduce the overall volume of the curtain. The front chambers 120, middle chambers 100, and rear chambers 150, when inflated, help to absorb the energy of impacts with the inflatable curtain 14 and help to distribute the impact energy over a large area of the curtain. The inflatable curtain 14 is maintained in the inflated condition for at least five seconds, which helps to ensure that the curtain will remain inflated throughout the duration of a side impact and/or a vehicle rollover.

Those skilled in the art will recognize that the front chambers 120, rear chambers 150, and middle chambers 100 of the inflatable curtain 14 may be defined by connections 70 having shapes and configurations different than those illustrated in FIGS. 1–8. Examples of inflatable curtains 14 having connections 70 with different shapes and configurations are illustrated in the embodiments of FIGS. 9 and 10.

A second embodiment of the present invention is illustrated in FIG. 9. The second embodiment of the invention is similar to the first embodiment of the invention illustrated in FIGS. 1–8. Accordingly, numerals similar to those of FIGS. 1–8 will be used in FIG. 9 to identify similar components, the suffix letter "a" being associated with the numerals of FIG. 9 to avoid confusion. The inflatable curtain 14a (FIG. 9) of the second embodiment includes connections 70a that have different configurations than the connections 70 (FIGS. 1–8) of the first embodiment.

As illustrated in FIG. 9, the inflatable curtain 14a includes a first connection 300 positioned generally in the front portion 62a of the curtain. The first connection 300 has a linear, generally horizontally arranged central portion and opposite drop-shaped end portions 302. A second connection 304 positioned generally in the middle portion 66a and rear portion 64a forms a non-inflatable portion 306 of the inflatable curtain 14a. A generally round third connection 310 is positioned in the rear portion 64a of the inflatable curtain 14a. The forwardmost chamber 122a is partially defined by the first connection 300 and the front edge 54a of the inflatable curtain 14a. The rearwardmost chamber 152a is partially defined by the second and third connections 304 and 310 and the rear edge 56a of the inflatable curtain 14a. The inflatable curtain 14a, prior to inflation, is placed in the stored position, i.e., rolled up in the outboard direction, in a manner identical to the inflatable curtain of the first embodiment.

As the inflatable curtain 14a is inflated, inflation fluid is directed from the fill tube (not shown) into the front portion 62a, rear portion 64a, and middle portion 66a. The forwardmost chamber 122a and the rearwardmost chamber 152a are initially inflated upon actuation of the inflator (not shown). The inflatable curtain 14a deploys generally evenly along the length of the curtain. The inflatable curtain 14a inflates in the downward direction and unrolls in the outboard direction, between the side structure of the vehicle and the vehicle occupants (not shown) in a manner similar or identical to the manner discussed above in regard to the inflatable curtain of the first embodiment.

As the inflatable curtain 14a inflates and unrolls in the downward direction and the outboard direction, the curtain is urged in the outboard direction towards the vehicle side structure (not shown). The inflatable curtain 14a is urged in the outboard direction towards the vehicle side structure 16 by the inflation of the forwardmost and rearwardmost chambers 122a and 152a and by the unrolling of the inflatable curtain 14a in the outboard direction. The inflatable curtain 14a unrolls in the outboard direction and rolls over or moves around the occupants' heads (not shown) towards the vehicle side structure.

The forwardmost chamber 122a, inflating downwardly and unrolling in an outboard direction, and being positioned in front of and vertically below the top of the front seat occupant's head, forces or wedges the inflatable curtain 14a between the front seat occupant's head and the vehicle side structure. This helps to resist movement of the inflatable curtain 14a away from the side structure of the vehicle and thus helps to prevent the curtain from inflating inboard of the front seat occupant.

The rearwardmost chamber 152a, inflating downwardly and unrolling in an outboard direction, and being positioned rearward of and vertically below the top of the rear seat occupant's head, forces or wedges the inflatable curtain 14a between the rear seat occupant's head and the vehicle side structure. This helps to resist movement of the inflatable curtain 14a away from the side structure of the vehicle and thus helps to prevent the curtain from inflating inboard of the rear seat occupant.

As the inflatable curtain 14a continues to inflate and unroll, the curtain continues to move in the downward direction. The inflatable curtain 14a moves the occupants' heads laterally in the vehicle away from the vehicle side structure. The forwardmost and chamber 122a, inflating in front of the front seat occupant's head is substantially unobstructed from deployment. The rearwardmost and chamber 152a, inflating rearward of the rear seat occupant's head, is substantially unobstructed from deployment. The forwardmost and rearwardmost chambers 122a and 152a, being substantially unobstructed from deployment, allow substantially unobstructed flow of inflation fluid through the chambers. The inflatable curtain 14a thus may thus be inflated rearwardly from the forwardmost chamber 122a between the front seat occupants' head and the vehicle side structure and thus may help move the front seat occupant's head away from the side structure. The inflatable curtain 14a may also be inflated forwardly from the rearwardmost chamber 152a between the rear seat occupants' head and the vehicle side structure and thus may help move the rear seat occupant's head away from the side structure. The inflatable curtain 14a is thus deployed into the inflated condition wherein the curtain is positioned between the front and rear seat occupants and the vehicle side structure.

The inflating curtain 14a thus moves the occupants' heads away from the vehicle side structure and the curtain inflates between the occupants and the vehicle side structure. The inflatable curtain 14a, when inflated, helps to protect the vehicle occupants in the event of a vehicle rollover or a side impact to the vehicle. The connections 70a help to limit the thickness of the inflated inflatable curtain 14a and help to reduce the overall volume of the curtain. The front chamber 120a, middle chamber 100a, and rear chamber 150a, when inflated, help to absorb the energy of impacts with the inflatable curtain 14a and help to distribute the impact energy over a large area of the curtain.

A third embodiment of the present invention is illustrated in FIG. 10. The third embodiment of the invention is similar to the first embodiment of the invention illustrated in FIGS. 1–8. Accordingly, numerals similar to those of FIGS. 1–8 will be used in FIG. 10 to identify similar components, the suffix letter "b" being associated with the numerals of FIG. 10 to avoid confusion. The inflatable curtain 14b (FIG. 10) of the third embodiment includes connections 70b that have different configurations than the connections 70 (FIGS. 1–8) of the first embodiment.

As illustrated in FIG. 10, the inflatable curtain 14b includes a first connection 320 positioned generally in the front portion 62b of the curtain. The first connection 320 has a diagonally extending central portion 322 and first and second opposite end portions 324 and 326, respectively. The first end portion 324 is positioned near the upper edge 50b of the inflatable curtain 14b and includes an aperture 86b. The second end portion 326 is spaced from and extends generally parallel to the lower edge 52b of the inflatable curtain 14b.

The inflatable curtain 14b includes a second connection 330 positioned generally in the middle portion 66b of the curtain. The second connection 330 has a diagonally extending central portion 332 and first and second opposite end portions 334 and 336, respectively. The first end portion 334 is positioned near the upper edge 50b of the inflatable curtain 14b and includes an aperture 86b. The second end portion 336 is spaced from and extends generally parallel to the lower edge 52b of the inflatable curtain 14b.

The inflatable curtain 14b includes a third connection 340 positioned generally in the middle portion 66b and rear portion 64b of the curtain. The third connection 340 forms a non-inflatable portion 342 of the inflatable curtain 14a. The third connection 340 includes an upper portion 344 including an aperture 86a and an end portion 346 extending in a generally vertical direction.

The inflatable curtain 14b includes a fourth connection 350 positioned generally in the rear portion 64b of the curtain. The fourth connection 350 has a first end portion 352 that intersects the rear edge 56b of the inflatable curtain 14b at the intersection of the rear edge 56b and the opening 202b. The fourth connection 350 has a generally drop-shaped second end portion 354 positioned opposite the first end portion 352. The second end portion 354 is positioned near the intersection of the rear edge 56b and the lower edge 52b of the inflatable curtain 14b.

The forwardmost chamber 122b is partially defined by the first connection 320 and the front edge 54b of the inflatable curtain 14a. The rearwardmost chamber 152b is partially defined by the third and fourth connections 340 and 350. In the embodiment illustrated in FIG. 10, the inflatable curtain 14b includes a fold-out chamber 360, partially defined by the fourth connection 350, positioned rearward of the rearwardmost chamber 152b. The fold-out chamber 360, however, is folded over along the fold line indicated at 362 such that the fold-out chamber overlies the remainder of the inflatable curtain 14b prior to rolling up the curtain into the stored position. The fold-out chamber 362 remains in this folded over position until the inflatable curtain 14b is substantially inflated. Thus, prior to inflation and for a substantial portion of the period of time during which the inflatable curtain 14b is inflated, the rearwardmost chamber 152b is the chamber positioned at the rearwardmost extent of the inflatable curtain 14b.

As the inflatable curtain 14b is inflated, inflation fluid is directed from the fill tube (not shown) into the front portion 62b, rear portion 64b, and middle portion 66b. The forwardmost chamber 122b and the rearwardmost chamber 152b are initially inflated upon actuation of the inflator (not shown). The inflatable curtain 14b inflates generally evenly along the length of the curtain. The inflatable curtain 14b inflates in the downward direction and unrolls in the outboard direction between the side structure of the vehicle and the vehicle occupants (not shown) in a manner similar or identical to the manner discussed above in regard to the inflatable curtain of the first embodiment. The fold-out chamber 360 unfolds from the folded over position after the inflatable curtain 14b is substantially inflated between the side structure of the vehicle and the vehicle occupant.

As the inflatable curtain 14b inflates and unrolls in the downward direction and the outboard direction, the curtain is urged in the outboard direction towards the vehicle side structure (not shown). The inflatable curtain 14b is urged in the outboard direction towards the vehicle side structure 16 by the inflation of the forwardmost and rearwardmost chambers 122b and 152b and by the unrolling of the curtain in the outboard direction. The inflatable curtain 14b unrolls in the outboard direction and rolls over or moves around the occupants' heads (not shown) towards the vehicle side structure.

The forwardmost chamber 122b, inflating downwardly and unrolling in an outboard direction, and being positioned in front of and vertically below the top of the front seat occupant's head, forces or wedges the inflatable curtain 14b between the front seat occupant's head and the vehicle side structure. This helps to resist movement of the inflatable curtain 14b away from the side structure of the vehicle and thus helps to prevent the curtain from inflating inboard of the front seat occupant.

The rearwardmost chamber 152b, inflating downwardly and in an outboard direction, and being positioned rearward of and vertically below the top of the rear seat occupant's head, forces or wedges the inflatable curtain 14b between the rear seat occupant's head and the vehicle side structure. This helps to resist movement of the inflatable curtain 14b away from the side structure of the vehicle and thus helps to prevent the curtain from inflating inboard of the rear seat occupant.

As the inflatable curtain 14b continues to inflate and unroll, the curtain continues to move in the downward direction. The inflatable curtain 14b moves the occupants' heads laterally in the vehicle away from the vehicle side structure. The forwardmost and chamber 122b, inflating in front of the front seat occupant's head is substantially unobstructed from deployment. The rearwardmost and chamber 152b, inflating rearward of the rear seat occupant's head, is substantially unobstructed from deployment. The forwardmost and rearwardmost chambers 122b and 152b, being substantially unobstructed from deployment, allow substantially unobstructed flow of inflation fluid through the chambers. The inflatable curtain 14b thus may thus be inflated rearwardly from the forwardmost chamber 122b between the front seat occupants' head and the vehicle side structure and thus may help move the front seat occupant's head away from the side structure. The inflatable curtain 14b may also be inflated forwardly from the rearwardmost chamber 152b between the rear seat occupants' head and the vehicle side structure and thus may help move the rear seat occupant's head away from the side structure. The inflatable curtain 14b is thus deployed into the inflated condition wherein the curtain is positioned between the front and rear seat occupants and the vehicle side structure.

The inflating curtain 14b thus moves the occupants' heads away from the vehicle side structure and the curtain inflates between the occupants and the vehicle side structure. The inflatable curtain 14b, when inflated, helps to protect the vehicle occupants in the event of a vehicle rollover or a side impact to the vehicle. The connections 70b help to limit the thickness of the inflated inflatable curtain 14b and help to reduce the overall volume of the curtain. The front chamber 120b, middle chambers 100b, and rear chamber 150b, when inflated, help to absorb the energy of impacts with the inflatable curtain 14b and help to distribute the impact energy over a large area of the curtain.

From the above description of the invention, those skilled in the art will perceive improvements, changes and modifications. For example, in the illustrated embodiments, separate connections define the front, middle and rear chambers of the inflatable curtain. The front, middle and rear chambers could, however, be defined by any number of connections, including a single connection. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device inflatable between the side structure of the vehicle and a vehicle occupant, said inflatable vehicle occupant protection device having a stored position in which said inflatable vehicle occupant protection device is rolled up in an outboard direction towards the vehicle side structure;

an inflation fluid source that provides inflation fluid for inflating said inflatable vehicle occupant protection device; and means for directing said inflatable vehicle occupant protection device to unroll away from the vehicle roof and at an angle toward the vehicle side structure, said inflatable vehicle occupant protection device comprising means for moving an occupant's head positioned against the side structure of the vehicle laterally in the vehicle and away from the vehicle side structure to allow said inflatable vehicle occupant protection device to inflate between the side structure of the vehicle and the occupant's head.

2. Apparatus as recited in claim 1, wherein said inflatable vehicle occupant protection device comprises a plurality of inflatable chambers including a forwardmost chamber, at least a portion of said forwardmost chamber being adapted to initially deploy adjacent the vehicle side structure forward of the occupant's head and vertically below the top of the occupant's head, a first portion of said inflatable vehicle occupant protection device inflating rearward of said at least a portion of said forwardmost chamber and being adapted to move the occupant's head laterally in the vehicle away from the vehicle side structure, said first portion being adapted to inflate between the side structure of the vehicle and the occupant's head.

3. Apparatus as recited in claim 1, wherein said inflatable vehicle occupant protection device is adapted to engage the occupant's head when the occupant's head is positioned against a side window of the vehicle side structure prior to inflation of said inflatable vehicle occupant protection device.

4. Apparatus as recited in claim 1, wherein said occupant is a front seat occupant of the vehicle.

5. Apparatus as recited in claim 2, wherein said first portion is adapted to be forced between the occupant's head and the vehicle side structure at least partially by inflation of said forwardmost chamber.

6. Apparatus as recited in claim 2, wherein said first portion is inflated at least partially by inflation fluid directed rearward from said forwardmost chamber into said first portion.

7. Apparatus as recited in claim 2, wherein said inflatable vehicle occupant protection device further includes an inflatable rearwardmost chamber positioned rearward of all other inflatable chambers, a second portion of said inflatable vehicle occupant protection device positioned forward of said rearwardmost chamber when inflated being adapted to engage a rear seat occupant's head positioned against the side structure of the vehicle, at least a portion of said rearwardmost chamber being adapted to initially deploy adjacent the vehicle side structure rearward of the rear seat occupant's head and vertically below the top of the rear seat occupant's head, said second portion inflating forward of said at least a portion of said rearwardmost chamber and being adapted to move the rear seat occupant's head away from the vehicle side structure, said second portion being adapted to inflate between the side structure of the vehicle and the rear seat occupant's head.

8. Apparatus as recited in claim 7, wherein said inflatable vehicle occupant protection device is adapted to engage the rear seat occupant's head when the rear seat occupant's head is positioned against a side window of the vehicle side structure prior to inflation of said inflatable vehicle occupant protection device.

9. Apparatus as recited in claim 7, wherein said second portion is adapted to be forced between the occupant's head and the vehicle side structure at least partially by inflation of said rearwardmost chamber.

10. Apparatus as recited in claim 7, wherein said second portion is inflated at least partially by inflation fluid directed forward from said rearwardmost chamber into said first portion.

11. Apparatus as recited in claim 2, wherein said inflatable vehicle occupant protection device includes front and rear portions spaced apart along the length of said inflatable vehicle occupant protection device, said forwardmost chamber being positioned at least partially in said front portion, said rearwardmost chamber being positioned at least partially in said rear portion.

12. Apparatus as recited in claim 11, wherein said forwardmost chamber defines said front portion and said rearwardmost chamber defines said rear portion, said inflatable vehicle occupant protection device further comprising a middle portion extending between said front and rear portions, said inflation fluid being directed from said front and rear portions into said middle portion when said inflatable vehicle occupant protection device is inflated.

13. Apparatus as recited in claim 1, wherein said inflatable vehicle occupant protection device when rolled up in said outboard direction towards the vehicle side structure is rolled up about an axis extending generally parallel to the length of said inflatable vehicle occupant protection device.

14. Apparatus as recited in claim 1, further comprising a housing for storing said inflatable vehicle occupant protection device in said stored, position, said inflatable vehicle occupant protection device and said housing having a generally elongated configuration extending along the side structure of the vehicle near the intersection of the side structure and the vehicle roof when said inflatable vehicle occupant protection device is in said stored position.

15. Apparatus as recited in claim 1, further comprising a fill tube for directing said inflation fluid into said inflatable vehicle occupant protection device to inflate said inflatable vehicle occupant protection device.

16. Apparatus as defined in claim 1, wherein said inflatable vehicle occupant protection device is an inflatable curtain.

17. Apparatus as defined in claim 1, wherein said inflation fluid source comprises a stored gas inflator for inflating said inflatable vehicle occupant protection device and maintaining said inflatable vehicle occupant protection device inflated for at least five seconds.

18. Apparatus for helping to protect an occupant of a vehicle that has a side structure and a roof, said apparatus comprising:

an inflatable vehicle occupant protection device inflatable between the side structure of the vehicle and a vehicle occupant, said inflatable vehicle occupant protection device including an inflatable front chamber and at least one inflatable chamber positioned rearward of said front chamber, said inflatable vehicle occupant protection device having a stored position in which said inflatable vehicle occupant protection device is rolled up in an outboard direction towards the vehicle side structure; and an inflation fluid source that provides inflation fluid for inflating said inflatable vehicle occupant protection device;

said inflatable vehicle occupant protection device being adapted to unroll away from the vehicle roof and angled toward the vehicle side structure, said at least one chamber when inflated being adapted to engage an occupant's head positioned against the side structure of the vehicle, said front chamber being adapted to deploy vertically below said at least one chamber engaging the top of the occupant's head, said at least one chamber being inflated at least partially by inflation fluid directed rearward from said front chamber into said at least one chamber, said at least one chamber moving the occupant's head away from the vehicle side structure.

19. Apparatus for helping to protect an occupant of a vehicle that has a side structure and a roof, said apparatus comprising:

an inflatable vehicle occupant protection device inflatable between the side structure of the vehicle and a vehicle occupant, said inflatable vehicle occupant protection device including an inflatable rear chamber and at least one inflatable chamber positioned forward of said front chamber, said inflatable vehicle occupant protection device having a stored position in which said inflatable vehicle occupant protection device is rolled up in an outboard direction towards the vehicle side structure; and an inflation fluid source that provides inflation fluid for inflating said inflatable vehicle occupant protection device;

said inflatable vehicle occupant protection device being adapted to unroll away from the vehicle roof and angled toward the vehicle side structure, said at least one chamber when inflated being adapted to engage an occupant's head positioned against the side structure of the vehicle, said rear chamber being adapted to deploy vertically below said at least one chamber engaging the top of the occupant's head, said at least one chamber being inflated at least partially by inflation fluid directed forward from said rear chamber into said at least one chamber, said at least one chamber moving the occupant's head away from the vehicle side structure.

20. A method for helping to protect an occupant of a vehicle that has a side structure and a roof, wherein a head of the occupant is positioned against the vehicle side structure, said method comprising the steps of:

providing an inflatable vehicle occupant protection device inflatable into a position between the side structure of the vehicle and a vehicle occupant;

providing an inflation fluid source that provides inflation fluid for inflating said inflatable vehicle occupant protection device;

rolling up said inflatable vehicle occupant protection device in an outboard direction towards the vehicle side structure into a stored position;

directing said inflatable vehicle occupant protection device to inflate and unroll in a direction away from the vehicle roof and angled toward the vehicle side structure; and moving the occupant's head away from the vehicle side structure by inflating and unrolling said inflatable vehicle occupant protection device between the vehicle side structure and the occupant's head.

21. Apparatus for helping to protect an occupant of a vehicle that has a side structure and a roof, said apparatus comprising:

an inflatable vehicle occupant protection device having a stored position rolled up in an outboard direction toward the vehicle side structure, said inflatable vehicle occupant protection device being inflatable away from the vehicle roof between the side structure of the vehicle and a vehicle occupant, said inflatable vehicle occupant protection device being constructed and arranged for engaging an occupant's head positioned against the side structure of the vehicle and unrolling between the occupant's head and the vehicle side structure to move the occupant's head laterally in the vehicle and away from the vehicle side structure, said inflatable vehicle occupant protection device being adapted to inflate between the side structure of the vehicle and the occupant's head.

22. The apparatus recited in claim 1, wherein said angle is about thirty degrees relative to a vertical axis in the vehicle.

23. The apparatus recited in claim 1, wherein said inflatable vehicle occupant protection device is adapted to engage the occupant's head proximate a location where the occupant's head engages the vehicle side structure.

24. Apparatus for helping to protect an occupant of a vehicle that has a side structure and a roof, said apparatus comprising:

an inflatable vehicle occupant protection device inflatable between the side structure of the vehicle and a vehicle occupant, said inflatable vehicle occupant protection device having a stored position in which said inflatable vehicle occupant protection device is rolled up in an outboard direction towards the vehicle side structure, said inflatable vehicle occupant protection device being free of any inboard roll and any inboard fold;

an inflation fluid source that provides inflation fluid for inflating said inflatable vehicle occupant protection device; and means for directing said inflatable vehicle occupant protection device to unroll away from the vehicle roof and at an angle toward the vehicle side structure;

said inflatable vehicle occupant protection device comprising means for moving an occupant's head positioned against the side structure of the vehicle laterally in the vehicle and away from the vehicle side structure to allow said inflatable vehicle occupant protection device to inflate between the side structure of the vehicle and the occupant's head.

25. Apparatus for helping to protect an occupant of a vehicle that has a side structure and a roof, said apparatus comprising actuatable means for moving an occupant's head positioned against the side structure laterally away from the side structure, said means for moving being deployable into engagement with the occupant's head from a stored position adjacent an intersection of the side structure of the vehicle and the vehicle roof.

* * * * *